United States Patent
Baumgarten et al.

(10) Patent No.: US 12,189,755 B2
(45) Date of Patent: Jan. 7, 2025

(54) AUTOMATED SYSTEM FOR PROGRAM IDENTITY-DRIVEN PROGRAM ACCESS CONTROL

(71) Applicant: Halcyon Tech, Inc., Austin, TX (US)

(72) Inventors: Remy Baumgarten, Naples, FL (US); Robert Bushner, Homeland, CA (US); Alejandro Espinoza, San Marcos, CA (US); Kristen Lamb, Austin, TX (US); Seagen Levites, Oregon City, OR (US); Clark Lindsey, Loudon, TN (US); Jonathan Miller, Poway, CA (US); Ryan Smith, Austin, TX (US)

(73) Assignee: Halcyon Tech, Inc., Austin, TX (US)

(*) Notice: Subject to any disclaimer, the term of this patent is extended or adjusted under 35 U.S.C. 154(b) by 0 days.

(21) Appl. No.: 18/642,515

(22) Filed: Apr. 22, 2024

(65) Prior Publication Data
US 2024/0354395 A1    Oct. 24, 2024

Related U.S. Application Data

(60) Provisional application No. 63/497,984, filed on Apr. 24, 2023.

(51) Int. Cl.
*G06F 21/44* (2013.01)
*G06F 21/56* (2013.01)
(Continued)

(52) U.S. Cl.
CPC .......... *G06F 21/44* (2013.01); *G06F 21/565* (2013.01); *G06F 21/445* (2013.01);
(Continued)

(58) Field of Classification Search
None
See application file for complete search history.

(56) References Cited

U.S. PATENT DOCUMENTS 11,522,703 B1 * 12/2022 Jain .................. H04L 9/0894
2001/0051515 A1 * 12/2001 Rygaard ............ H04L 63/123
455/406
(Continued)

FOREIGN PATENT DOCUMENTS

CN    110688627 A  *  1/2020  ............. G06F 21/10
CN    114091027 A  *  2/2022  ........... G06F 21/561
(Continued)

OTHER PUBLICATIONS

Christian Collberg, Sam Martin, Jonathan Myers and Jasvir Nagra; (Distributed Application Tamper Detection Via Continuous Software Updates); pp. 10; Published on (Year: 2012).*

(Continued)

*Primary Examiner* — Eleni A Shiferaw
*Assistant Examiner* — Ali H. Cheema
(74) *Attorney, Agent, or Firm* — Jones Day (57) ABSTRACT

A program identity of an unknown binary is inferred in response to a trigger (e.g., a request to access or execute the unknown binary, etc.). One or more authentication factors are then executed to authenticate the inferred program identity of the unknown binary as being one of a plurality of different programs. The program can be selectively provided with access to system resources and/or sensitive operations can be limited based on a program nature of the authenticated program identity. In some variations, the authentication factors cause a modified authentication workflow in which a human user provides input as to whether or not to authenticate the inferred program identity.

21 Claims, 7 Drawing Sheets

(51) Int. Cl.
   *G06F 21/55* (2013.01)
   *H04L 9/40* (2022.01)
(52) U.S. Cl.
   CPC .......... *G06F 21/554* (2013.01); *G06F 21/561* (2013.01); *G06F 21/566* (2013.01); *H04L 63/029* (2013.01); *H04L 63/101* (2013.01); *H04L 63/20* (2013.01)

(56) References Cited

U.S. PATENT DOCUMENTS

| | | | | |
|---|---|---|---|---|
| 2004/0268313 | A1* | 12/2004 | Teglia | G06F 21/52 717/124 |
| 2005/0289270 | A1* | 12/2005 | Modave | G06F 21/54 710/200 |
| 2006/0174319 | A1* | 8/2006 | Kraemer | G06F 21/57 726/1 |
| 2006/0265578 | A1* | 11/2006 | Modave | G06F 11/28 714/E11.178 |
| 2007/0265972 | A1* | 11/2007 | Tsutsui | G06Q 30/06 705/52 |
| 2008/0172341 | A1* | 7/2008 | Crandell | G06F 21/31 713/168 |
| 2010/0275014 | A1* | 10/2010 | Kelley | G06F 21/51 713/157 |
| 2016/0087956 | A1* | 3/2016 | Maheshwari | H04W 4/08 726/6 |
| 2016/0098272 | A1* | 4/2016 | Lee | G06F 8/77 717/123 |
| 2016/0142418 | A1 | 5/2016 | Barton et al. | |
| 2017/0206034 | A1* | 7/2017 | Fetik | G06F 3/0604 |
| 2017/0223024 | A1* | 8/2017 | Desai | H04L 63/20 |
| 2019/0278914 | A1* | 9/2019 | Le Roy | G06F 21/575 |
| 2020/0380114 | A1* | 12/2020 | Kursun | G06N 3/08 |
| 2020/0382491 | A1* | 12/2020 | Kursun | H04L 63/1425 |
| 2022/0027475 | A1 | 1/2022 | Seth | |

FOREIGN PATENT DOCUMENTS

| | | | | |
|---|---|---|---|---|
| KR | 20140068964 A | * | 6/2014 | ......... G06F 21/6218 |
| WO | WO-0079385 A1 | * | 1/2000 | ............... G06F 8/20 |
| WO | WO-2022092824 A1 | * | 5/2022 | ............. H04L 47/24 |

OTHER PUBLICATIONS

Hayawardh Vijayakumar, Xinyang Ge, Mathias Payer and Trent Jaeger; (Jigsaw: Protecting Resource Access by Inferring Programmer Expectations); pp. 17; Aug. 20-22, 2014.*
Kevin Scott and Jack Davidson; (Safe Virtual Execution Using Software Dynamic Translation); pp. 10; Dec. 9-13, 2002.*
Hristina Palikareva, Tomasz Kuchta and Cristian Cadar (Shadow of a Doubt: Testing for Divergences Between Software Versions); pp. 12; IEEE (Year: 2016).*
Chao Zhang, Tao Wei, Zhaofeng Chen, Lei Duan, Laszlo Szekeres, Stephen McCamant, Dawn song, and Wei Zou; (Practical Control Flow Integrity & Randomization for Binary Executables); pp. 15; Published on IEEE (Year: 2013).*
International Search Report and Written Opinion mailed Jun. 26, 2024 for International Application PCT/US2024/025806 filed Apr. 23, 2024 (15 pages).

* cited by examiner

AUTOMATED SYSTEM FOR PROGRAM IDENTITY-DRIVEN PROGRAM ACCESS CONTROL

RELATED APPLICATION

The current application claims priority to U.S. Pat. App. Ser. No. 63/497,984 filed on Apr. 24, 2023, the contents of which are hereby incorporated by reference.

TECHNICAL FIELD

The subject matter described herein relates to the use of advanced techniques to prevent or otherwise circumvent ransomware from infiltrating and exploiting one or more computing systems.

BACKGROUND

Ransomware is an increasingly pervasive type of malicious software (malware) in which access to personal or enterprise data is perpetually blocked until a ransom is paid. In particular, the personal or enterprise data is encrypted (often in situ) and the means to decrypt such data is only provided after receipt of a payment (often in cryptocurrency).

SUMMARY

In a first aspect, a program identity of an unknown binary is inferred in response to a trigger. Thereafter, one or more authentication factors are executed to authenticate the inferred program identity of the unknown binary as being one of a plurality of different programs. If the program identity is authenticated, the program can be selectively provided with access to system resources based on a program nature of the authenticated program identity. Optionally, if the program identity is not authenticated, the program can be prevented from accessing some or all system resources.

In an interrelated aspect, a program identity of an unknown binary is inferred in response to trigger. One or more authentication factors are then executed to authenticate the inferred program identity of the unknown binary as being one of a plurality of different programs. Certain sensitive operations can be selectively prohibited or limited based a program nature of the authenticated program identity.

If it is determined that the executed one or more authentication factors is unable to authenticate the inferred program identity, then a manual authentication workflow (i.e., a computer workflow in which user-input is utilize) can be initiated in which contextual information about the unknown binary is displayed in a graphical user interface for human authentication of the unknown binary.

Further, the trigger can be based on the unknown binary requesting access to a system resource and/or the unknown binary commencing initialization.

The plurality of authentication factors can include one or more executable integrity tests in which scripts forming part of the unknown binary are cryptographically verified as being from a known source. The one or more executable integrity tests can include one or more of: Authenticode, strong name signing, one or more Linux schemes, Android Package Kit (APK) Signing, Apple code signing. PowerShell signing, and JavaScript signing.

In some cases, it can be determined that the unknown binary has been modified relative to a known binary. In such cases, it can be determined whether the modifications of the unknown binary are congruent modifications which preserve a program nature of the unknown binary or divergent modifications which change a program nature of the unknown binary. Access by the program to system resources and/or the ability to perform sensitive operations can be allowed when it is determined that the modifications of the unknown binary are congruent. Access by the program to system resources and/or sensitive operations prohibited or limited can be prevented when it is determined that the modifications of the unknown binary are divergent.

In an interrelated aspect, a program identity of an unknown binary seeking to access a resource or in response to a request to run the binary is inferred. The inferred program identity of the unknown binary is automatically inferred as being one of a plurality of different programs when a plurality of authentication factors provide a confidence indicator above a threshold level. A manual authentication workflow can be initiated in which contextual information about the unknown binary is displayed in a graphical user interface for human authentication of the unknown binary. In such cases, the program can be selectively provided with access to system resources based on a program nature.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages such as enhanced detection of ransomware prior to its execution as well as advanced techniques for countering ransomware after it has initiated execution. The current subject matter is also advantageous in that it can provide automatic assignment of a program identity and automatically authenticate a program identity. In addition, the current subject matter can automatically perform access control based on program identity. Further, the current subject matter can provide contextual information in a graphical user interface to aid humans to most simply, efficiently, and accurately assign a Program Identity. Still further, the current subject matter can be used to aid humans to most simply, efficiently, and accurately authenticate a program identity aid humans to manage program identity and access control.

The details of one or more variations of the subject matter described herein are set forth in the accompanying drawings and the description below. Other features and advantages of the subject matter described herein will be apparent from the description and drawings, and from the claims.

DETAILED DESCRIPTION

Figure 1:
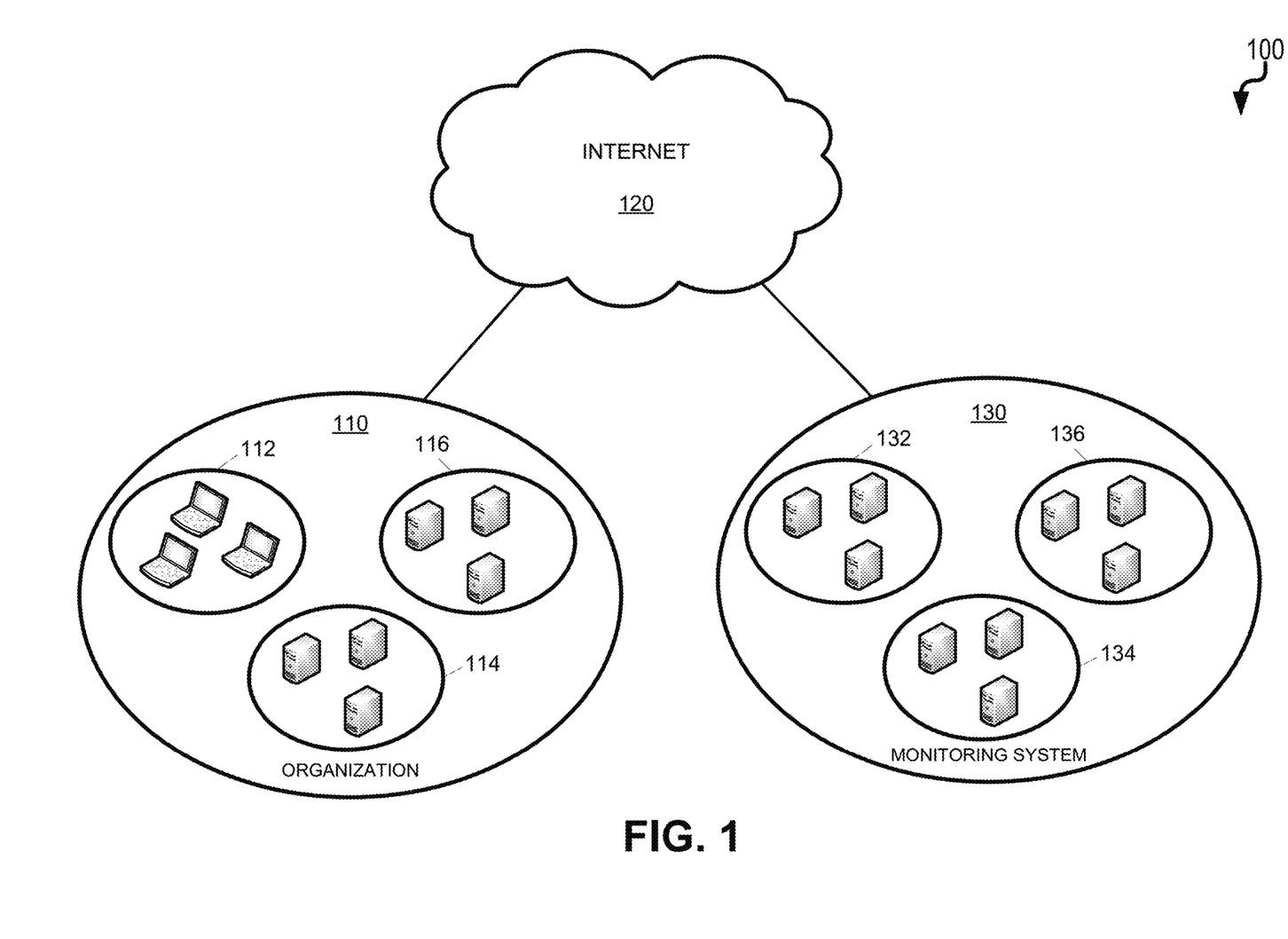
FIG. 1 is a first diagram illustrating an architecture for preventing ransomware which utilizes machine learning.

FIG. 1 is an example architecture diagram which is directed to the computing resources of an organization 110 which are monitored, in part, via a computer network 120 (e.g., the Internet, etc.) by an antiransomware monitoring system 130. The organization computing resources 110 can include a plurality of endpoints 112 (i.e., endpoint computing devices, etc.), a plurality of servers 114, and, as will be described below, a plurality of aggregators 116. The aggregators 116 can comprise dedicated computing devices and/or software executing on one of the endpoints 112 or servers 114 within the organization. Agents operated and/or monitored by the monitoring system 130 can be deployed on the endpoints 112 and servers 114. The agents can collect data, watch events, respond to events, and perform operations on the computing device on which it is installed. These agents can provide identify and provide relevant information relating to a potential ransomware attack or other malicious activities.

The monitoring system 130 can include various computing devices which are segregated by tenant system 132 (i.e., data associated with the organization can be maintained separately from the data associated with other entities/organizations). The tenant systems 132 can store organizational information, configuration information, and can communicate with agents deployed on the organization's networks. In the absence of aggregators 116, the agents described above can communicate directly with a corresponding tenant system 132 and some functionality may be reduced.

The monitoring system 130 can include various computing devices for analyzing or handling incoming data feeds 134 (received via the network 120) associated with the organization computing resources 110 or from other outside sources. Further, the monitoring system 130 can include analysis servers 136 which can analyze the data feeds 134 in order to assess whether software executing by the organization computing resources 110 is likely to comprise ransomware or malware. This analysis can be at different granularities from the event/process level up to an orchestration (i.e., data exchange, etc.) across different computing devices. Stated differently, the monitoring system 130 is responsible for storing, processing, and the creation and distribution of detection logic.

As noted above, aggregators 116 can be deployed within the enterprise computing resources 110. The aggregators 116 can serve various functions. As an example, the aggregators 116 can act as a local distributor of information, in order to reduce the bandwidth requirement of the product (i.e., they reduce the amount of network traffic with the monitoring system 130). The aggregators 116 can also act as a bastion host, allowing the monitoring system 130 to perform operations on a customer's network outside of an agent. A bastion host, in this context, can be a special purpose computer on the network of the organization that is specifically defined and configured to withstand attacks. The aggregator 116, in such scenarios, can host a single application or process to minimize the threat of such computer (as opposed to executing multiple applications which increases the overall threat level for the aggregator 116).

Figure 2:
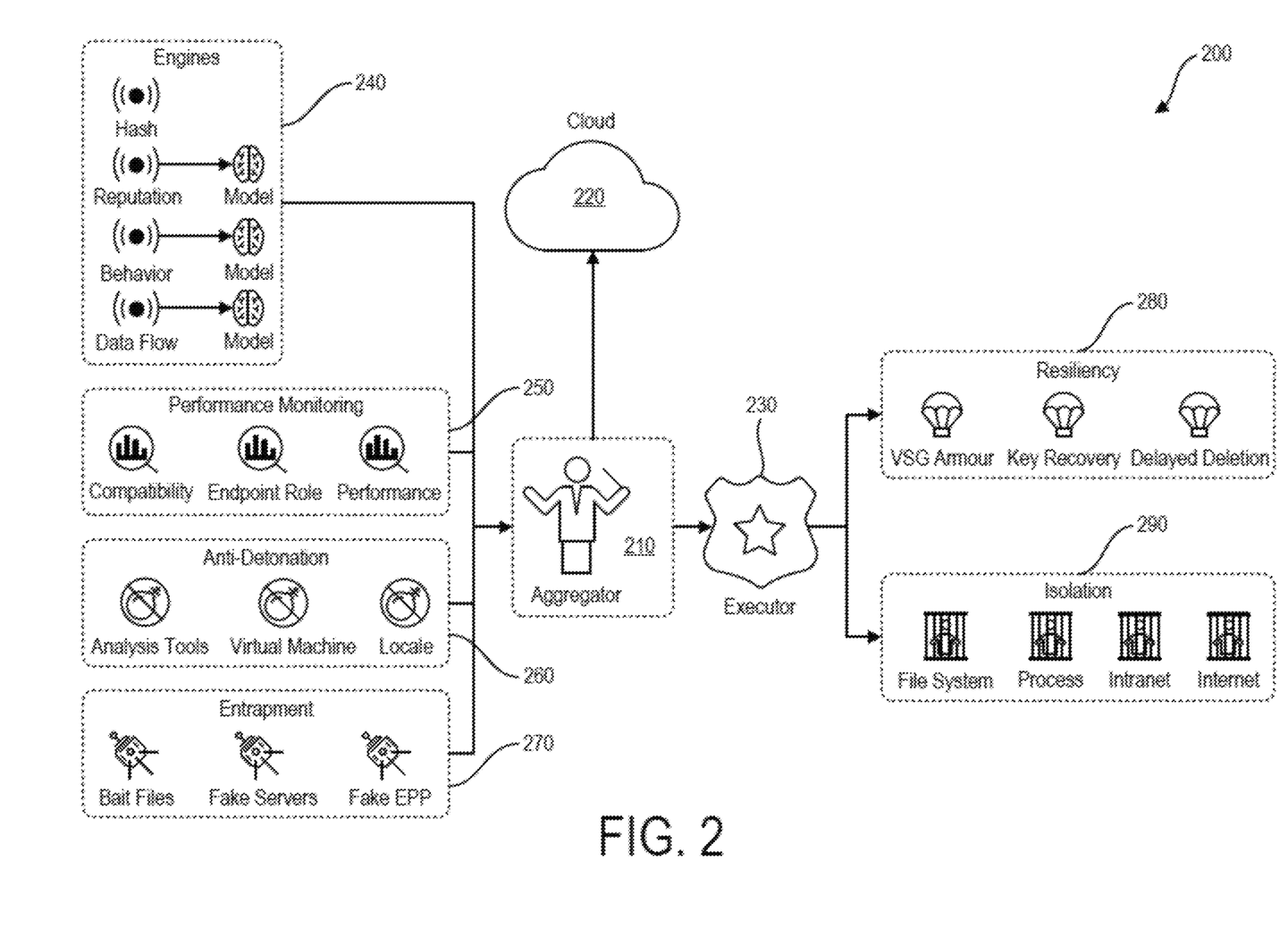
FIG. 2 is a second diagram illustrating an architecture for preventing ransomware which utilizes machine learning.

FIG. 2 is a diagram illustrating various components that can form part of an agent. The aggregator 210 can be responsible for invoking all of measurement components (described in further detail below), collect the data generated by such measurement components, and pass such data either directly to an off-system aggregator (e.g., an aggregator forming part of the monitoring system 130). The executor 230 can ameliorate information through synthesis of input information such as looking at the statistics of individual pieces of input information, combining disparate pieces of input information, or using a model to derive a higher level meaning from base input information, and execute decision logic which can cause certain software/processes from executing/continuing to execute, etc. The executor 230 can also be used to activate optional components such as sandboxes, file system virtualization and isolation, and components which would have an impact on a process' performance but would be desirable when the process meets a level of suspiciousness.

Within the architecture of FIG. 2, there can be several measurement components 240-290 which feed data to the aggregator 210 and/or can be activated by the executor 230. These components fall under one of several categories.

An information producer component can produce information that specifies or characterizes when files are accessed, processes using system APIs, information regarding the reputation of the binary or modules (i.e., code being analyzed, etc.) in the process, system-wide changes, and patch level changes. This information can be produced based on events that are occurring on the system so that the executor 230 can make informed decisions. Example information producer components can include engines 240, a performance monitoring component 250, and a resiliency component 280.

The engines 240 can perform various activities including hashing data (e.g., executables and other code, etc.) and executing various models (e.g., machine learning models, statistical models, etc.) which can characterize reputation, behavior, and/or dataflow of the various software in relation to maliciousness including the likelihood of such software being ransomware. These characterizations, in turn, can be used to determine whether or not some sort of corrective action (e.g., ransomware countermeasures, isolating software, limiting access to software, prohibiting or otherwise limiting sensitive operations, preventing software from executing, etc.) might need to be undertaken to prevent ransomware from activating and/or continuing to execute. The machine learning models can take various forms (e.g., neural networks, regression models, support vector machines, random forest, etc.) and can be trained, in some cases, using historical data with known classifications or labels. In some cases, weak supervision can be utilized while a system is first deployed to generate sufficient data to further train the model(s). The models can also be trained using unsupervised, semi-supervised, or reinforced learning techniques.

The performance monitoring component 250 can monitor aspects such as compatibility, endpoint role, as well as overall performance. For instance, as new protection measures (i.e., ransomware countermeasures) fundamentally change the way the system operates, this component can measure whether or not those changes to the operating system are relevant to the system's adjacent programs (so that countermeasures can be deployed or activated to not affect system performance above a pre-defined threshold/metric, etc.). The endpoint role can be a category that the system or computing device represents such as web server, database server, accountant workstation or developer workstation. The endpoint role can then be used to customize the protection that is applied to optimize parameters of the protection for that endpoint based on its role (i.e., a role-based approach can be applied to each computing device being protected using the current subject matter). Finally, overall performance can be monitored to determine the impact of the endpoint on the system and the cause of any detrimental performance to provide a closed loop on optimizing the system for the endpoints.

The resiliency component 280 can provide various operations which can help maintain access to the data of the organization even if the ransomware detonates. For example, the resiliency component 280 can leverage shadow copies of files (e.g., volume snapshot service (VSS) generated snapshots). The resiliency component 280 can provide mechanisms for key recovery. The resiliency component 280 can further be configured to delay deletion of files on the various endpoints 112 and servers 114. Such delays can be implemented, for example, by hooking areas of the file system or kernel calls so that the files are temporarily moved whenever a deletion attempt occurs.

Simulacrum components be software executables or processes that can simulate properties on the system for the purposes of behavior amplification or triggering self-immolation within malware. The term simulacrum, as used herein, refers to computer-implemented/software techniques to simulate changes in properties of the system being monitored (while not actually changing such properties). For example, simulacrum can be deployed or executed to trigger actions by potential ransomware which can be countered, or which can confirm that an executable/DLL is indeed ransomware. In some examples, simulacrum can represent that certain system components exist when they do not, obscure certain system components, and/or change an identity type of system components. This representation will consist of having signs of those conditions, without having those actual conditions. Simulacrum components can include an anti-detonation component 260 and an entrapment component 270.

The anti-detonation component 260 can execute various ransomware countermeasures to prevent ransomware from detonating (i.e., activating). These operations can include analysis tools to identify or otherwise characterize the particular type of ransomware being deployed. The anti-detonation component 260 can also initiate a sandbox environment for the software in question. For example, the sandbox environment can cause one or more processors associated with an executable or DLL in question to be executed and monitored by a virtual machine (so as not to affect the operation of any receiving computing device, etc.). In addition, in some cases, the anti-detonation component 260 can spoof or otherwise change locale information of the endpoints. In this regard, as one example, some hostile software has code that will render itself inactive if the system appears to be in a country contained within the Commonwealth of Independent States. Additionally, some hostile software has code that will attempt to detect if it is being analyzed and hide the software's intent by rendering its ransomware properties inactive. The anti-detonation component 260 can take advantage of these behaviors as well as others that similarly render hostile software inactive.

The entrapment component 270 can be used to trigger or otherwise encourage behavior from an executable/DLL that, if present, indicates that the executable/DLL include ransomware. The entrapment component 270 can create and deploy bait files (i.e., files which appear to comprise sensitive information, but which are otherwise not useful to the enterprise such as fake personnel data). Further, the entrapment component 270 can create fake servers and/or fake extensible provisioning protocol (EPP) status codes and the like to further interact with the ransomware to confirm its malicious intent and/or disable such ransomware. The information about the entrapment component 270 can be used to neutralize ransomware before and/or after it initiates.

Mechanism modification components 280 and 290 can change how the organization computing resources 110 operate to reduce the impact of malware's actions on these resources. These mechanism modification components 280, 290 can be selectively applied to suspicious processes/DLL so as to avoid a negative impact on the system (which would occur if the components were applied evenly to every process on the system). This arrangement allows these mechanism modification components 280, 290 to reduce negative impact of hostile code/processes while retaining desirable system parameters such as performance (i.e., system performance can be affected up until a certain threshold, etc.). Example mechanism modification components can include an isolation component 290 and the resiliency component 280.

The isolation component 280 can take various measures to prevent access by software suspected to include ransomware including a local file system on an endpoint 112 or server 114. The isolation component 290 can also prevent a process being executed by an endpoint 112 or server from accessing or using other resources. Further, the isolation component 290 can be used to prevent a particular endpoint 112 or server 114 from accessing an intranet and/or the internet.

Action components can perform actions on an endpoint 112 such as to install patches or terminate the execution of malware. The isolation component 290 can be a type of action component.

When an action is taken by a user or a program in the organization computing resources 110 in which a malware sample may be executed, the executor 230 can include a mechanism that can generate a notification that such an event is going to take place, before that event takes place. At this point in time, the pre-execution engines can analyze the events surrounding the execution of a process or DLL including aspects relating to one or more of an execution chain of trust, a provenance of the corresponding executable, a category of the executable, suspicious indicators and the like. The pre-executing engines can extract or otherwise generate features for any of these categories and later make such features (e.g., in the form of a vector, etc.) to one or more machine learning models.

With the execution chain of trust, the trustworthiness of the execution chain following all parents of the execution event can be analyzed. For example, when a user double clicks on an executable using a MICROSOFT WINDOWS system, explorer.exe is responsible for making the execution request. However, if an attacker were to exploit a GOOGLE CHROME browser to launch malware, then GOOGLE CHROME would be responsible for creating the request. These two different parentages of execution yield a different trustworthiness value for the execution. This can be accomplished by the executor 230 observing the creation of processes, and the process responsible for that creation. When an exploit hits GOOGLE CHROME to launch a process, the executor 230 can see that request with GOOGLE CHROME as the requestor. Similarly, the executor 230 can see the request made with explorer.exe as the requestor and mark the newly requested process as having a parent of explorer.exe. As both of these parents processes have differing levels of trust/suspiciousness due to their manufacturers, binary properties, and relevant attack history, the resulting child process can inherit those trust/suspiciousness levels and/or have suspiciousness scores based on parent suspicion scores.

The provenance of the executable can be determined or characterized by analyzing various properties of an executable. These properties can include one or more of: code signature correctness, company of origin, source of an executable (e.g., USB or other solid state drive, downloaded over the internet, etc.), compiler used to generate the binary, date and time of the production of the binary, number of machine hours spent safely executing the program locally and across the organization computing resources 110 and the like.

The category of the executable can be determined by analyzing various attributes including presence of an executable obfuscator, make, model, and settings of executable obfuscator, language and compiler used to produce the executable, imports and exports of the executable, strings present within the executable, executable resource, size of an executable and the like. Examples of software categories include: platform and management, education and reference, home and entertainment, productivity suites, multimedia players, file viewers, web browsers, collaboration tools, enterprise resource management, customer relations management, supply chain and manufacturing tasks, application development, information management and access, product manufacturing and delivery and the like. These software categories are important so that the model can relate executable features as being related to a specific product category that has a specific set of manufacturers. For example, ransomware may have properties related to administrative categories or productivity suites. These aspects can be observed by the engines 240, for example, by using the information synthesis in the executor 230. Since these two categories are distinct, but observed to be overlapping, they can be used to make a negative judgement by the executor 230).

Suspicious indicators (i.e., attributes or features which are suggestive of ransomware/malware, etc.) can be analyzed. Example indicators can include: modified rich headers, entropy of sections, presence of URLs, section names, presence of appended data, checksum disagreement. As with all of the collected information, features can be extracted or otherwise generated for use by a downstream application or process (e.g., one or more machine learning models, etc.).

These categories of events/attributes can be collectively taken into account as either a score or dimension for the executable (or otherwise utilized by a machine learning model). Some or all of these dimensions can be fed into each other to determine whether they agree. As an example, it is unlikely that something that appears to be an administrative tool should use an executable obfuscator, have a high number of suspicious elements, and is not signed by the company that produced the program. If these measured elements disagree to a high enough certainty, then the monitoring system 130 can prevent the executable from executing (either directly or via one of the deployed agents). If the measurement elements do not produce enough certainty, then the monitoring system 130 can allow the executable to execute. The monitoring system 130 can log these different dimension values in what can be viewed as a suspiciousness value that will follow the program throughout its execution. These suspiciousness values are generated by taking the output of the engines 240 anti-detonation 260 and entrapment 270 components and using algorithms to optimally combine them. In some variations, the scores can be weighted and added together. In other variation, these scores and other extracted features can be input into a machine learning model such as a convolutional neural network whose weights have been trained to produce an optimal output value.

If the monitoring system 130 determines that a program will be allowed to run, the next decision it will make is whether the program is a good candidate for imposing artificial simulacra. For programs that are not suspicious, which is the majority of programs, no artificial simulacra will be imposed. This decision allows increased compatibility and improved performance by the monitoring system 130 because all of the software that an organization would want to run without impediment will fall within the "not suspicious" category.

For programs that rise to the level of suspicion to warrant simulacra. The monitoring system 130 can inject various simulacrum within the program's view of the environment. Such injections can be accomplished through various means including kernel hooking, file system filters, and network drivers all falling under the executor 230.

There are two primary purposes behind the simulacra. The first is to trigger malware's built in anti-detonation protection mechanisms. The operating environment on the endpoint 112 and/or server 114 can be modified in order to have the executable (i.e., the suspected malware) to determine that it is operating within a restricted geographic region. For example, Russian malware authors prevent their software from performing malicious actions against Russian computer systems and such features can be used to effectively disable malware. The simulacra can also be used to generate properties that lead the executable to conclude that it is being analyzed. Such an arrangement can specify the presence of analysis tools on the corresponding endpoint 112 or server 114 (which would cause the executable to undertake some anti-detonation processes to prevent it from being disabled) and/or indicators that the software is being debugged.

The simulacra can also be used to simulated properties that lead the executable to conclude that the corresponding endpoint 112 or server 114 (or collection of computing devices within the organization computing resources 110) is not valuable. For example, the simulacra can indicate that the system is a virtual machine and/or can obscure or otherwise hide user personal files (i.e., the absence of which indicating that the system is not useful for ransomware purposes).

The simulacra can be used to simulate properties that the executable to believe that it has already ran. As an example, some malware creates a mutex, flag file, or checks for custom file extensions in order to prevent doubly encrypting a machine and such artifacts can be simulated by the simulacra.

The second purpose behind injecting simulacra within the malware's view of a system (i.e., the operating environment) is to increase the amount of bad behavior the executable will exhibit. The performance monitoring component 250 can measure behavior of the executable which will increase the amount of signal upon which the monitoring system 130 can judge the executable (i.e., more data will be available which the models can consume in characterizing the executable, etc.). Additionally, any behavior oriented endpoint protection that is running concurrently on the endpoint 112 can also observe the bad behavior and be more capable of making a judgment against the executable. Examples of this type of simulacra include the following simulating the presence of multiple endpoint protection products (on each endpoint point 112 or server 114). The performance monitoring component 250 can monitor attempts of the executable in disabling such endpoint protection products. The presence of database software can be simulated as some types of ransomware will attempt to stop or otherwise interface with database servers so that the malware can encrypt the database. The simulacra can simulate the presence of artificial user files which some types of ransomware attempt to access (and for which there is no legitimate reason for the executable to access such artificial user files). The simulacra can simulate the presence of backup software which some types of ransomware will attempt to stop and remove previous backups so that the user will not have backups available.

For an executable whose anti-detonation features have been triggered, the execution will stop. Additionally, the performance monitoring component 250 can measure that the anti-detonation features have been triggered and other resources forming part of the organizational computing resources 110 can be updated so that it may stop the executable more expediently on other endpoints 112 and/or servers 114. For executables that have not triggered anti-detonation features, execution can continue with this augmented perspective of the system (so that the performance monitoring component 250 can obtain additional information regarding the executable).

Figure 3:
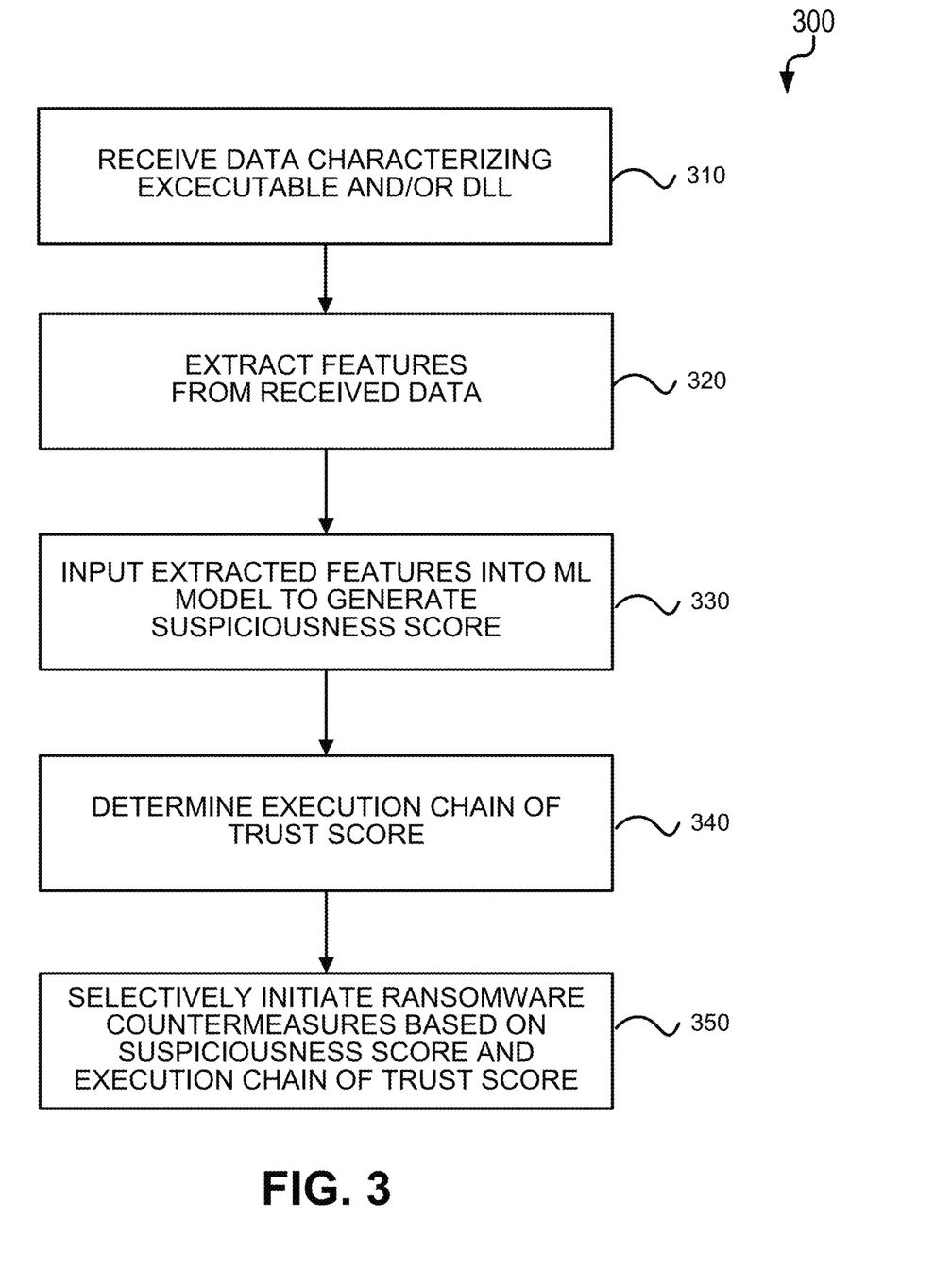
FIG. 3 is a first process flow diagram illustrating for preventing ransomware utilizing machine learning.

FIG. 3 is a process flow diagram 300 in which, at 310, data is received that comprises or characterizes an executable and dynamic linked library (DLL). Features are then extracted, at 320, from the executable and DLL. The extracted features are input, at 330, into at least one machine learning model to generate a suspiciousness score. The machine learning model can be trained to determine whether the executable file comprises ransomware. An execution chain of trust score for the executable and DLL can later be determined, at 340, based on the extracted features and the suspiciousness score. This execution chain of trust score for the executable and DLL characterizes one or more associated parent processes. This suspiciousness score and the execution chain of trust score can be used, at 350, to determine whether or not to initiate one or more ransomware countermeasures.

Figure 4:
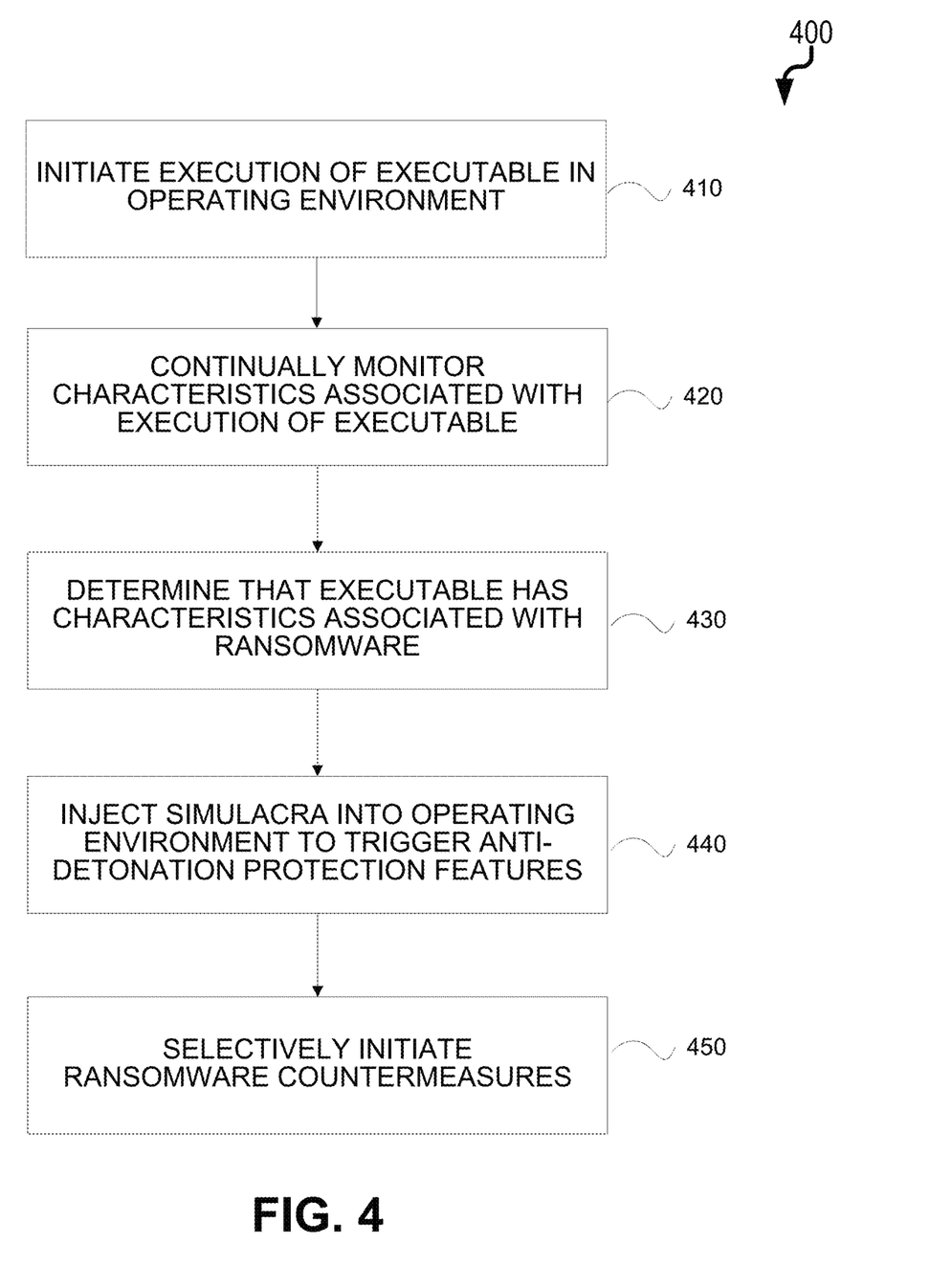
FIG. 4 is a second process flow diagram for preventing ransomware utilizing machine learning.

FIG. 4 is a process flow diagram 400 in which, at 410, execution of an executable is initiated in an operating environment. Thereafter, at 420, characteristics associated with the execution of the executable are continually monitored. It is later determined, at 430, that the executable has one or more characteristics associated with ransomware. In response to such determination, at 440, at least one simulacra is injected into the operating environment to attempt to trigger an anti-detonation protection feature by the executable file. Subsequently, at 450, one or more ransomware countermeasures can be initiated based on behavior of the executable after injection of the at least one simulacra.

Program Identifier. In some implementations, different workflows can be implemented based on program identifiers such as manual authentication and/or implementation of various remedial measures. These workflows can be used in combination or alternatively to the processes described above. An organization has many programs that they intend to run on their compute resources. Organizations have an informal concept of the Program Nature and Production Organization for the majority of these programs. The current subject matter formalizes the concepts of Program Nature and Production Organization and tie these concepts to a Program Identifier embodied, for example, as a GUID that is constant across releases of software that do not include Divergent Modifications. The following expounds upon Program Nature and Production Organization as they relate to a Program Identifier. As a result of this link organizations can look at a program and reason about the following non exhaustive list of concerns about a program: (i) what business needs are served (ii) whether it is unwanted (iii) contractually required obligations (iv) system resources required (v) network resources required, (vi) risk ratings and the like.

Program Nature. A Program Identity can be linked to the concept of a Program Nature. There are many facets of a Program's Nature and reason's behind this link. The first is a general concept of a malicious program versus a program that is required for business to be conducted. If the Program Identity has a malicious nature, it would be advantageous for an organization not to run the associated program. The second is a concept of what system resources are required as a result of the Program's Nature. As an example, a program that is a text editor does not need access to change the system clock. To elaborate further, a program that is a text editor produced by company A may need access to company A's Internet servers, but has no reason to require access to company B's Internet servers. The Program Nature of a program may evolve over time as new versions are released, but once the Program Nature is established, deviations are few and incremental.

Production Organization. A Program Identity should be linked to one or more Production Organizations. For example, the following programs should have a Program Identifier that allows the program to be linked back to the respective Production Organizations:

TABLE 1

| Program | Production Organization |
| --- | --- |
| Microsoft Word | Microsoft |
| Adobe Photoshop | Adobe |
| Norton Ghost | Symantec |
| VMWare Workstation | VMWare, Broadcom |

The value of linking a Program Identity to a Production Organization is multifaceted. One example is if the Production Organization were to maliciously and surreptitiously change the Program Nature, there may be legal renumeration that can be pursued to mitigate the consequences of the deception. Another example is companies can fall under the jurisdiction of different nations, and there are different concerns depending on the laws or standing of those nations. Another example is that some organizations have built a reputation for trustworthiness, security, or other qualities that are implied to transfer to their product. Another example is that sometimes a previously trustworthy Production Organization or its supply chain may become compromised in a way that introduces a Divergent Modification to a program. Finally, an organization may have an agreement with a Production Organization that specifies bow the Production Organization achieves security, how the data is handled, and a multitude of other agreements. Linking a Program Identity to a Production Organization allows linking a program to these various qualities, concerns, and production guarantees.

Program Authentication. In current state of the art computer systems, programs do not explicitly claim an identity. Microsoft Word may have a specific icon, have file attributes that say "Microsoft Word", but there is not a field intended and dedicated to claiming the identity of Microsoft Word. Additionally, there is no non-a fungible identifier for Microsoft Word. Further, there are thousands of unique versions of Microsoft Word that all contain the same program nature.

The consequence of these facts is that a system that performs program authentication must first determine (i.e., infer, etc.) An identity against which to authenticate an unknown binary. This differs from traditional authentication systems where an unknown entity claims an identity and then proves the identity. There may be cases where the program identity cannot be automatically determined and in these cases a system designed to allow humans to manually assign an identity could be leveraged.

After an identity or set of identities is derived for the given program, the next step can be to prove the program identity to a maximum level of assuredness. Traditional authentication systems use algorithms that are mathematically proven to be complex, but program authentication must rely on a range of authentication factors that have varying levels of mathematical complexity and in some cases using schemes that have no provable mathematical complexity.

Once you've assigned an identity and performed authentication of a program against that identity you're left in one of two states. The first is that the authenticating factors are strong enough that the program identity is fully authenticated. The second case is that the authenticating factors are too weak to automatically authenticate the program identity. In some variations, relevant contextual information about the unknown binary can be displayed in a graphical user interface or otherwise conveyed to a user in order to allow such user to authenticate the inferred program identity.

Finally, once a program identity is authenticated, access control can be selectively provided to the program identity (i.e., the unknown binary) and/or sensitive operations can be selectively allowed. Access control can be both broad such as "do not allow the program identity to execute", and fine grained such as "only allow this program identity to contact or otherwise utilize these network resources", and the like.

There are two main elements of program access control. The first element is program authentication. This is when a given program is analyzed and a program identity is produced. The second is program access control. This is when that binary identity is used directly, or it's matched to a group, that is ultimately bestowed a set of access rights and inspections.

The first element of program access control is program authentication, a system that given a binary produces a binary identity. The ideal system for program authentication would treat all versions of all binaries regardless of any congruent modifications as the same binary identity. Additionally, it would treat any divergent modifications to a binary or any attempts by an attacker to forge an identity as different. Finally, it would be ideal to have a mathematical proof that guarantees these aspects of a binary identity. Where the constraints of reality force such a system from an ideal, it should take a minimum of effort to correct the system to show the same or a different identity for the current outlier and any outlier going forward.

The second element of program access control is the assignment of rights to resources and the assignment of inspections based on a program's authenticated identity. These can either be directly based on the binary identity produced during program authentication or can be based on a group or role to which a binary identity is assigned. Access can be as blunt as "execution allowed" or as fine grained as "allowed to access another program". Inspections can either be completely turned off, or turned on incrementally. One example of an inspection is "keep a copy of encryption keys".

Program Authentication. When considering program authentication there are two categories for identities: undesirable and trusted. Various factors can be used in determining in which of these two categories a particular program falls within. Program nature as used herein can refer to the underlying teleological purpose of a program. This may be extended in iterations of new versions of a program, but the fundamental properties are not changed. Divergent modifications as used herein can refer to a modification to a program's data representation that changes the program nature. Congruent modifications as used herein can refer to a modification to a program's data representation that preserves the program nature. Representational disguise as used herein can refer to a contrived representation that is given to a program for the purpose of impersonating another program with a different program nature. Representational obfuscation as used herein can refer to a contrived representation that is given to a program for the purpose of frustrating the understanding of the program nature. Program identity as used herein can refer to a concept that integrates an understanding of a program's nature and the identity of the organization that produced the program. A program's identity should remain constant under new versions of a program.

Figure 5:
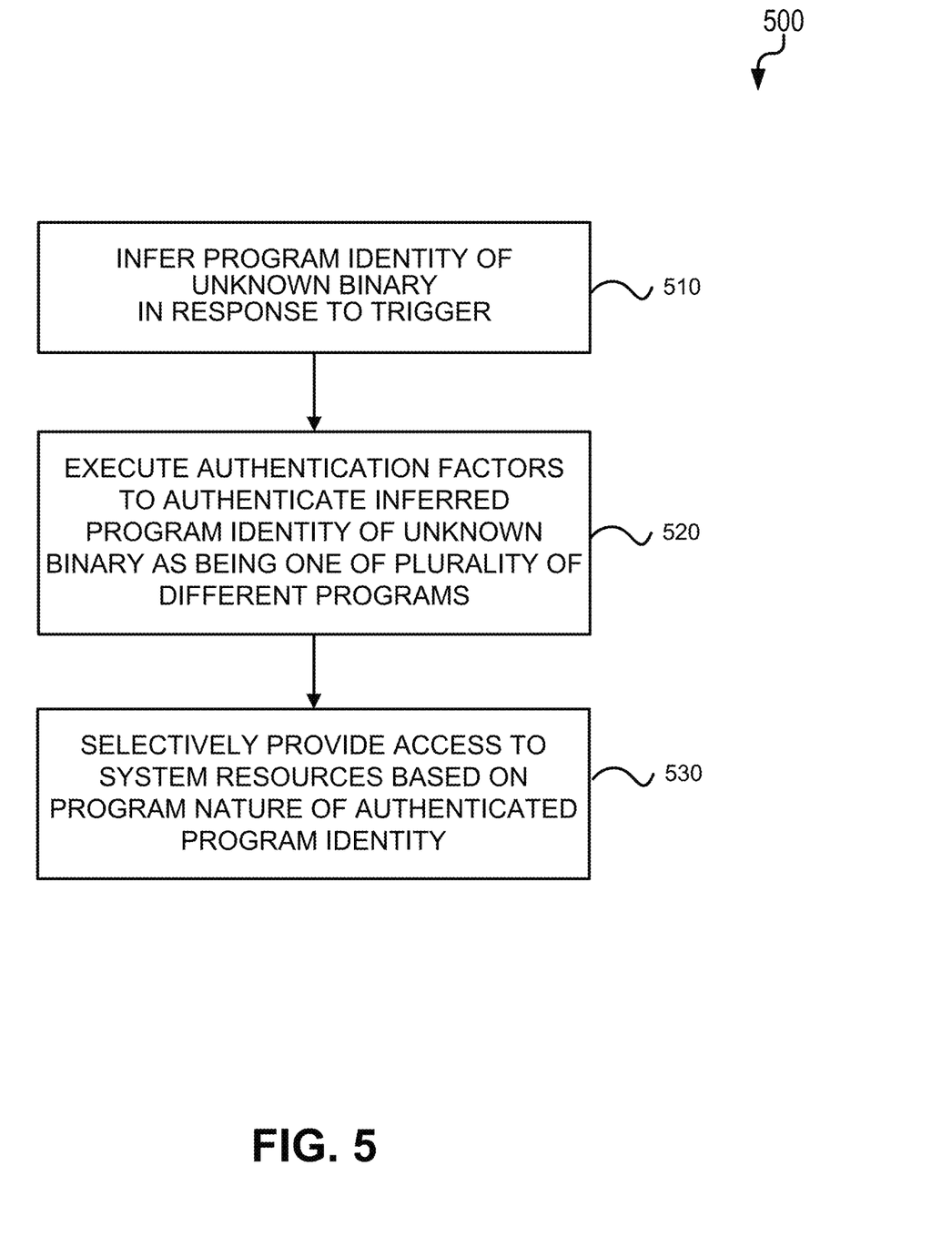
FIG. 5 is a process flow diagram illustrating program identity-driven program access control in which access to resources is selectively provided.

With reference to diagram 500 of FIG. 5, at 510, a program identity of an unknown binary is inferred in response to a trigger. Thereafter, at 520, one or more authentication factors are executed to authenticate the inferred program identity of the unknown binary as being one of a plurality of different programs. If the program identity is authenticated, at 530, the program can be selectively provided with access to system resources based on a program nature of the authenticated program identity. Optionally, if the program identity is not authenticated, the program can be prevented from accessing some or all system resources.

Figure 6:
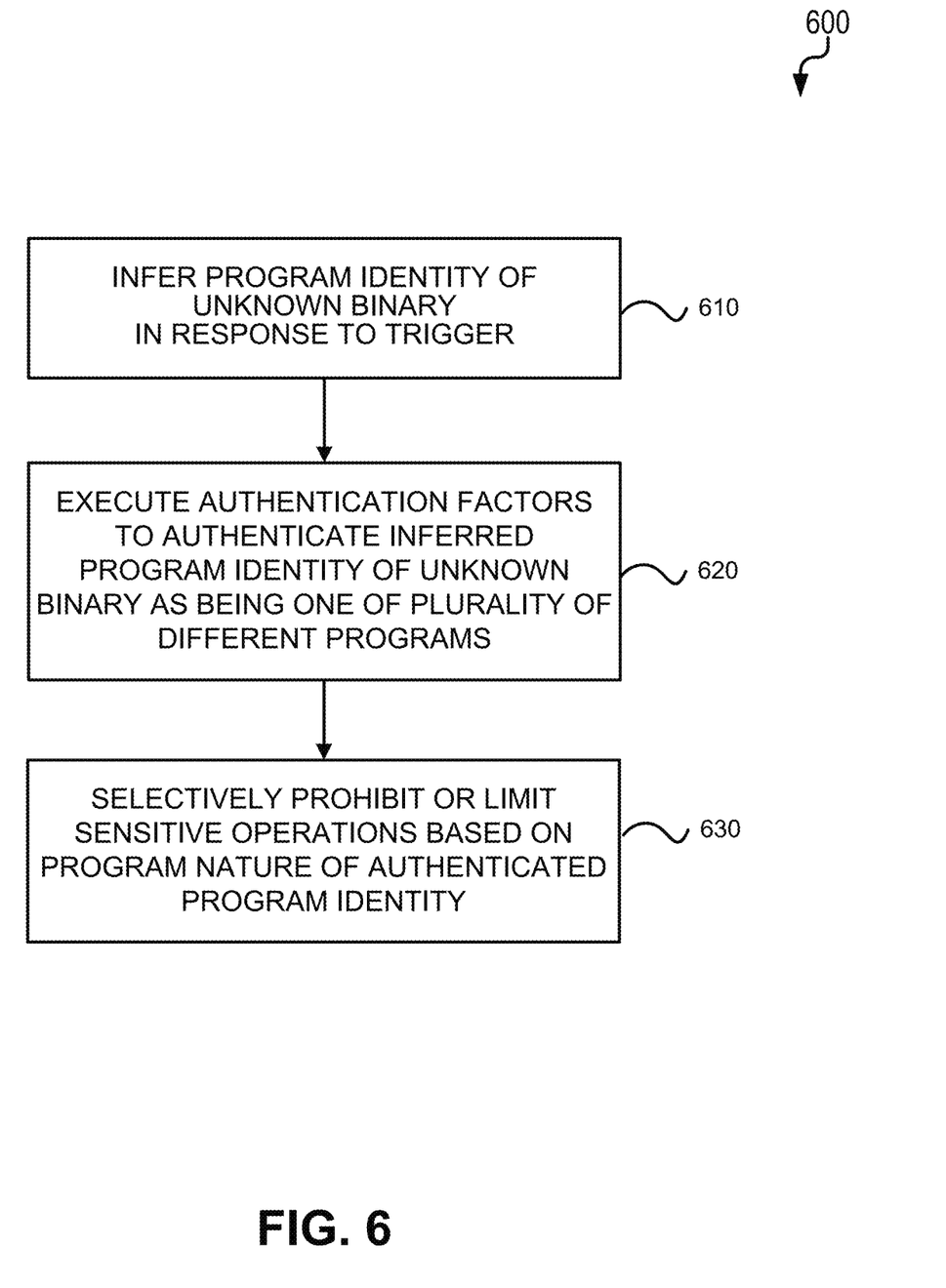
FIG. 6 is a process flow diagram illustrating program identity-driven program access control in which sensitive operations are prohibited or limited.

With reference to diagram 600 of FIG. 6, at 610, a program identity of an unknown binary is inferred in response to a trigger. Thereafter, at 620, one or more authentication factors are executed to authenticate the inferred program identity of the unknown binary as being one of a plurality of different programs. If the program identity is authenticated, at 560, sensitive operations can be prohibited or otherwise limited based on a program nature of the authenticated program identity. Optionally, if the program identity is not authenticated, the program can be prevented from accessing some or all system resources. The workflow of FIG. 6 can work in tandem or separately from that of FIG. 5.

If it is determined that the executed one or more authentication factors is unable to authenticate the inferred program identity, then a manual authentication workflow (i.e., a computer workflow in which user-input is utilize) can be initiated in which contextual information about the unknown binary is displayed in a graphical user interface for human authentication of the unknown binary.

Further, the trigger can be based on the unknown binary requesting access to a system resource and/or the unknown binary commencing initialization.

The plurality of authentication factors can include one or more executable integrity tests in which scripts forming part of the unknown binary are cryptographically verified as being from a known source. The one or more executable integrity tests can include one or more of: Authenticode, strong name signing, one or more Linux schemes, Android Package Kit (APK) Signing, Apple code signing, PowerShell signing, and JavaScript signing.

In some cases, it can be determined that the unknown binary has been modified relative to a known binary. In such cases, it can be determined whether the modifications of the unknown binary are congruent modifications which preserve a program nature of the unknown binary or divergent modifications which change a program nature of the unknown binary. Access by the program to system resources can be allowed when it is determined that the modifications of the unknown binary are congruent. Access by the program to system resources can be prevented when it is determined that the modifications of the unknown binary are divergent.

Further, a program identity of an unknown binary seeking to access a resource or in response to a request to run the binary is inferred. The inferred program identity of the unknown binary is automatically inferred as being one of a plurality of different programs when a plurality of authentication factors provide a confidence indicator above a threshold level. A manual authentication workflow can be initiated in which contextual information about the unknown binary is displayed in a graphical user interface for human authentication of the unknown binary. In such cases, the program can be selectively provided with access to system resources based on a program nature.

Sensitive operations as provided herein can take various forms. For example, sensitive operations can include operations that can be performed on a computer system that relate to the confidentiality, integrity, or availability of a system. One example is the deletion of backups within a system. A second example is the creation of a user within the system. A third example is changing the list of programs that are executed upon system startup. The consistent theme among these operations that make them sensitive are that these operations are generally performed by an attacker and restricting those operations may not be achievable through the gating of access to a system resource alone, instead the individual action must be inspected. The program identity system can match the program identity to the sensitive operation in circumstances in which the program identity does not allow for the sensitive operation, then the operation would be cancelled (i.e., prohibited or limited, etc.). In certain scenarios, it may be more advantageous to terminate a program that attempts a sensitive operation for which the identity of the program does not allow for the sensitive operation.

Figure 7:
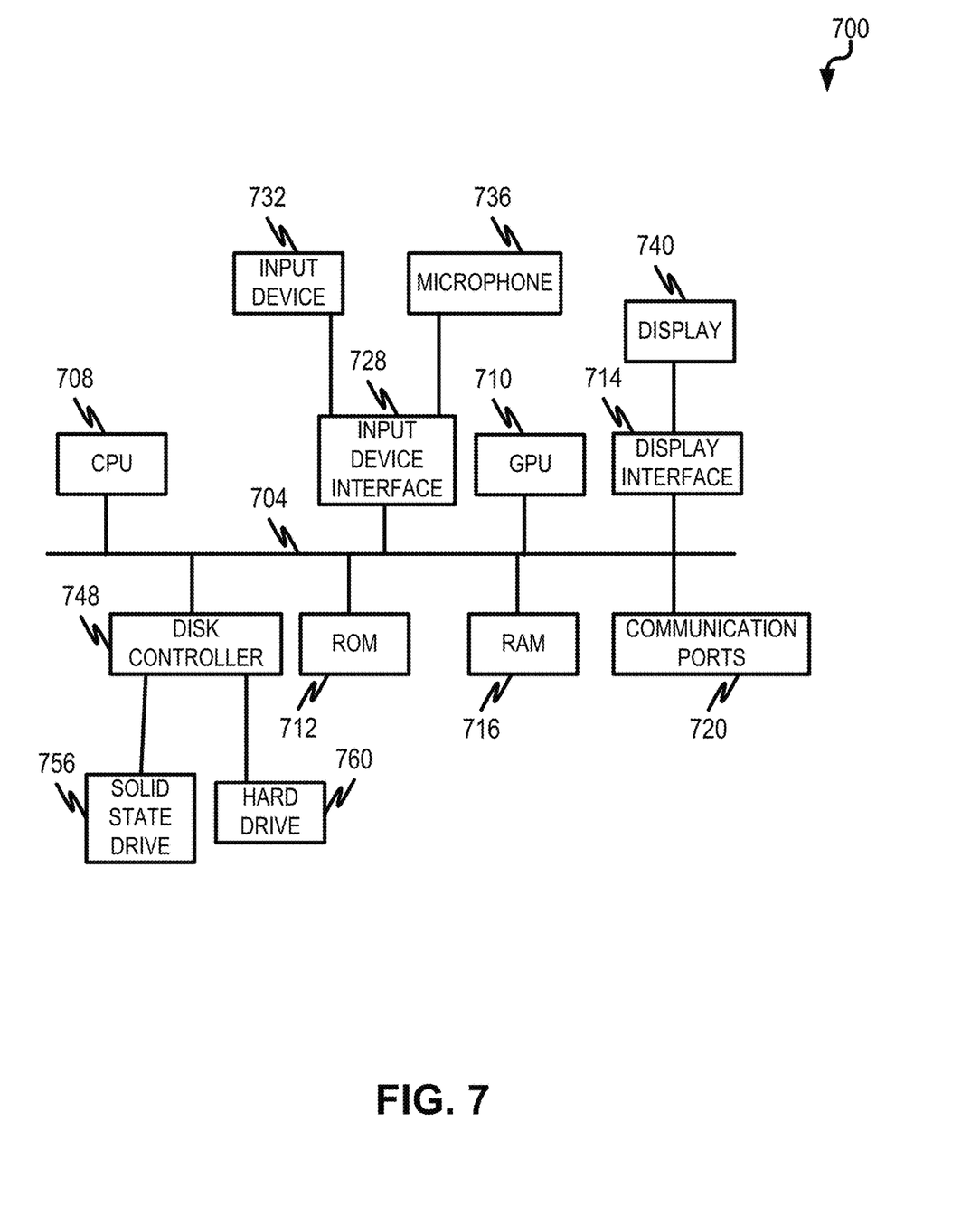
FIG. 7 is a diagram illustrating aspects of a computing device for implementing aspects of the current subject matter.

FIG. 7 is a diagram 700 illustrating a sample computing device architecture for implementing various aspects described herein. A bus 704 can serve as the information highway interconnecting the other illustrated components of the hardware. A processing system 708 labeled CPU (central processing unit) (e.g., one or more computer processors/data processors at a given computer or at multiple computers), can perform calculations and logic operations required to execute a program. In addition, a processing system 710 labeled GPU (graphics processing unit) (e.g., one or more computer processors/data processors at a given computer or at multiple computers), can perform calculations and logic operations required to execute a program. A non-transitory processor-readable storage medium, such as read only memory (ROM) 712 and random access memory (RAM) 716, can be in communication with the processing system 708 and can include one or more programming instructions for the operations specified here. Optionally, program instructions can be stored on a non-transitory computer-readable storage medium such as a magnetic disk, optical disk, recordable memory device, flash memory, or other physical storage medium.

In one example, a disk controller 748 can interface with one or more optional disk drives to the system bus 704. These disk drives can be external or internal including solid state drives such as 756, or external or internal hard drives 760. As indicated previously, these various disk drives 756, 760 and disk controllers are optional devices. The system bus 704 can also include at least one communication port 720 to allow for communication with external devices either physically connected to the computing system or available externally through a wired or wireless network. In some cases, the at least one communication port 720 includes or otherwise comprises a network interface.

To provide for interaction with a user, the subject matter described herein can be implemented on a computing device having a display device 740 (e.g., an LED, LCD, etc. monitor) for displaying information obtained from the bus 704 via a display interface 714 to the user and an input device 732 such as keyboard and/or a pointing device (e.g., a mouse or a trackball) and/or a touchscreen by which the user can provide input to the computer. Other kinds of input devices 732 can be used to provide for interaction with a user as well; for example, feedback provided to the user can be any form of sensory feedback (e.g., visual feedback, auditory feedback by way of a microphone 736, or tactile feedback); and input from the user can be received in any form, including acoustic, speech, or tactile input. The input device 732 and the microphone 736 can be coupled to and convey information via the bus 704 by way of an input device interface 728. Other computing devices, such as dedicated servers, can omit one or more of the display 740 and display interface 714, the input device 732, the microphone 736, and input device interface 728.

One or more aspects or features of the subject matter described herein can be realized in digital electronic circuitry, integrated circuitry, specially designed application specific integrated circuits (ASICs), field programmable gate arrays (FPGAS) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B," "one or more of A and B;" and "A and/or B" are each intended to mean "A alone, B alone, or A and B together." A similar interpretation is also intended for lists including three or more items. For example, the phrases "at least one of A. B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method for implementation by one or more computing devices comprising:
   inferring, in response to a trigger, a program identity of an unknown binary;
   executing one or more authentication factors to authenticate the inferred program identity of the unknown binary as being one of a plurality of different programs, the one or more authentication factors comprising one or more executable integrity tests in which scripts forming part of the unknown binary are cryptographically verified as being from a known source;
   determining that the unknown binary has been modified relative to a known binary;
   determining whether modifications of the unknown binary are congruent modifications or divergent modifications, the congruent modifications comprising a modification to a data representation of the known binary which preserve a program nature of the unknown binary, the divergent modifications comprising a modification to a data representation of the known binary which change the program nature of the unknown binary;
   selectively providing the unknown binary with access to system resources based on the program nature of the authenticated program identity and based on the determination of whether the modifications of the unknown binary are said congruent modifications or said divergent modifications.

2. The method of claim 1, further comprising:
   determining that the executed one or more authentication factors is unable to authenticate the inferred program identity;
   initiating a manual authentication workflow in which contextual information about the unknown binary is displayed in a graphical user interface for human authentication of the unknown binary.

3. The method of claim 1, further comprising:
   preventing the unknown binary from accessing the system resources when it is not authenticated.

4. The method of claim 1, wherein the trigger comprises the unknown binary requesting access to a system resource or performing a sensitive operation.

5. The method of claim 1, wherein the trigger comprises the unknown binary commencing initialization.

6. The method of claim 1, wherein the one or more executable integrity tests comprises one or more of: Authenticode, strong name signing, one or more Linux schemes, Android Package Kit (APK) Signing, Apple code signing, PowerShell signing, and JavaScript signing.

7. The method of claim 1, further comprising:
   allowing access by the unknown binary to the system resources when it is determined that the modifications of the unknown binary are congruent; and
   preventing access by the unknown binary to the system resources when it is determined that the modifications of the unknown binary are divergent.

8. The method of claim 1, wherein the divergent modifications characterize representational disguise which comprises a contrived representation that is given to a program for to impersonate another program with a different program nature.

9. The method of claim 1, wherein the divergent modifications characterize representational obfuscation which comprises a contrived representation that is given to a program for frustrating an understanding of the program nature.

10. A method for implementation by one or more computing devices comprising:
  inferring, in response to a trigger, a program identity of an unknown binary;
  executing one or more authentication factors to authenticate the inferred program identity of the unknown binary as being one of a plurality of different programs, the one or more authentication factors comprising one or more executable integrity tests in which scripts forming part of the unknown binary are cryptographically verified as being from a known source;
  determining that the unknown binary has been modified relative to a known binary;
  determining whether modifications of the unknown binary are congruent modifications or divergent modifications, the congruent modifications comprising a modification to a data representation of the known binary which preserve a program nature of the unknown binary, the divergent modifications comprising a modification to a data representation of the known binary which change the program nature of the unknown binary; and
  selectively prohibiting sensitive operations by the unknown binary based on the program nature of the authenticated program identity and based on the determination of whether the modifications of the unknown binary are said congruent modifications or said divergent modifications.

11. The method of claim 10, further comprising:
  determining that the executed one or more authentication factors is unable to authenticate the inferred program identity;
  initiating a manual authentication workflow in which contextual information about the unknown binary is displayed in a graphical user interface for human authentication of the unknown binary.

12. The method of claim 10, further comprising:
  prohibiting a set of sensitive operations when it is not authenticated.

13. The method of claim 10, wherein the trigger comprises the unknown binary requesting access to a system resource or performing a sensitive operation.

14. The method of claim 10, wherein the trigger comprises the unknown binary commencing initialization.

15. The method of claim 10, wherein the one or more executable integrity tests comprises one or more of: Authenticode, strong name signing, one or more Linux schemes, Android Package Kit (APK) Signing, Apple code signing, PowerShell signing, and JavaScript signing.

16. The method of claim 10, further comprising:
  allowing access by the unknown binary to system resources when it is determined that the modifications of the unknown binary are congruent; and
  preventing access by the unknown binary to system resources when it is determined that the modifications of the unknown binary are divergent.

17. The method of claim 10, wherein the divergent modifications characterize representational disguise which comprises a contrived representation that is given to a program for to impersonate another program with a different program nature.

18. The method of claim 10, wherein the divergent modifications characterize representational obfuscation which comprises a contrived representation that is given to a program for frustrating an understanding of the program nature.

19. A method for implementation by one or more computing devices comprising:
  individually inferring, for each of a plurality of unknown binaries, a program identity of the unknown binary seeking to access a resource or in response to a request to run the unknown binary;
  automatically authenticating the inferred program identity of each of the unknown binaries as being one of a plurality of different programs when a plurality of authentication factors provide a confidence indicator above a threshold level, the plurality of authentication factors comprising one or more executable integrity tests in which scripts forming part of the unknown binary are cryptographically verified as being from a known source;
  initiating, when the confidence indicator of the corresponding unknown binary is at or below the threshold level, a manual authentication workflow in which contextual information about the unknown binary is displayed in a graphical user interface for human authentication of the unknown binary;
  determining, for each unknown binary, that the unknown binary has been modified relative to a known binary;
  determining, for each unknown binary, whether modifications of the unknown binary are congruent modifications or divergent modifications, the congruent modifications comprising a modification to a data representation of the known binary which preserve a program nature of the unknown binary, the divergent modifications comprising a modification to a data representation of the known binary which change the program nature of the unknown binary;
  assigning a same program identifier to each binary having a congruent modification relative to a same known binary; and
  selectively providing each binary with access to system resources or prohibiting sensitive operations based on the program nature of the program after automatic or human authentication of the unknown binary and based on the program identifier.

20. The method of claim 19, wherein the one or more executable integrity tests comprises one or more of: Authenticode, strong name signing, one or more Linux schemes, Android Package Kit (APK) Signing, Apple code signing, PowerShell signing, and JavaScript signing.

21. The method of claim 20, further comprising:
  allowing access by the unknown binary to the system resources when it is determined that the modifications of the unknown binary are congruent; and
  preventing access by the unknown binary to the system resources when it is determined that the modifications of the unknown binary are divergent.

* * * * *